United States Patent [19]
Guzaski

[11] 3,861,291
[45] Jan. 21, 1975

[54] ROLLING APPARATUS

[75] Inventor: Joseph A. Guzaski, Franklin Park, Ill.

[73] Assignee: International Telephone and Telegraph Corporation, Nutley, N.J.

[22] Filed: Apr. 12, 1973

[21] Appl. No.: 350,555

Related U.S. Application Data

[63] Continuation-in-part of Ser. No. 321,486, Jan. 5, 1973, abandoned.

[52] U.S. Cl. ............................ 99/450.2, 425/391
[51] Int. Cl. ........................................ A21c 11/00
[58] Field of Search .... 99/353, 450.2, 450.3, 450.1, 99/450.6; 425/319, 320, 321, 391, 322; 72/146; 192/105 CD

[56] References Cited
UNITED STATES PATENTS

| | | | |
|---|---|---|---|
| 2,420,100 | 5/1947 | Salsbury | 192/105 CD X |
| 3,037,467 | 6/1962 | Rustad | 425/391 X |
| 3,611,950 | 10/1971 | Battaglia | 99/450.6 X |

*Primary Examiner*—Harvey C. Hornsby
*Assistant Examiner*—Alan Cantor
*Attorney, Agent, or Firm*—John T. O'Halloran; Menotti J. Lombardi, Jr.

[57] ABSTRACT

Rolling apparatus is described comprising a plurality of rolling elements that are rotatably mounted and have attached thereto arcuate rolling members adapted for rolling flat strip material into a roll with the material being conveyed in a transverse direction to the rolling direction.

11 Claims, 6 Drawing Figures

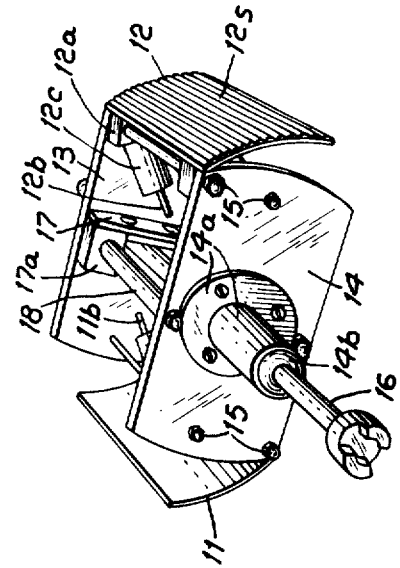

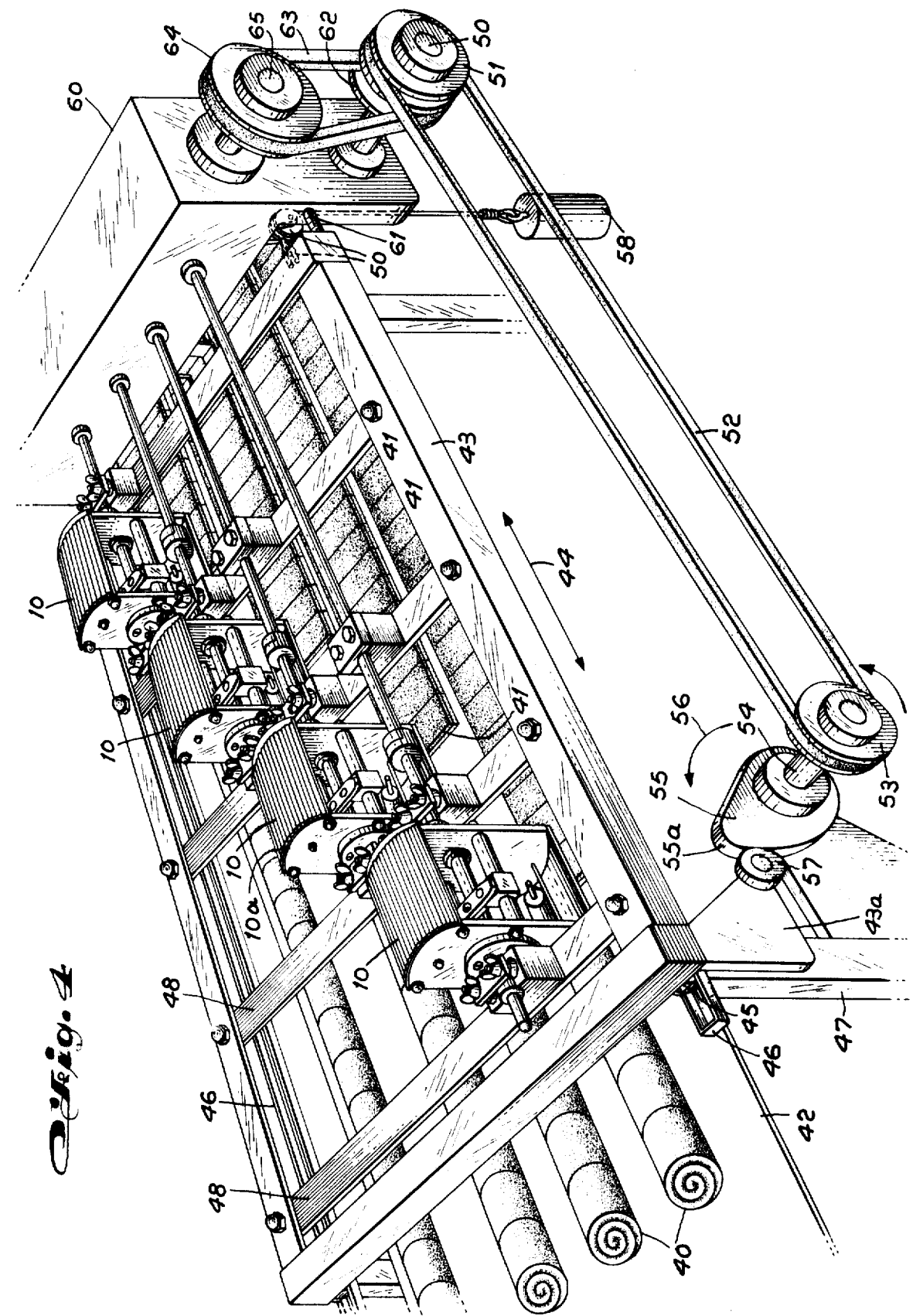

3,861,291

ROLLING APPARATUS

This application is a continuation-in-part of application Ser. No. 321,486, filed Jan. 5, 1973, now abandoned.

BACKGROUND OF THE INVENTION

In general, this invention relates to rolling apparatus, and more particularly to apparatus for rolling cake and similar type products.

In commercial bakeries, many bakery type products require the rolling of a baked or other slabbed material to form in production a uniform coil or roll that is to be further processed or packaged and dispatched. The present invention is aimed at providing an improved apparatus for use in the mass production of a cake roll in which the cake batter is prepared in the form of a continuous strip which is advanced on a steel conveyor band. The batter on the band is then passed through an oven, and the cake is cooked whereupon a layer of filling is deposited on the baked continuous strip and the strip is selectively cut into individual lengths in order to make the individual cake roll. In the normal practice, operators take hold of the cut strips and roll them by hand, and then the rolled cake is passed through a chocolate enrobing device. The finished enrobed rolls are then packaged and shipped for sale.

According to the present invention, the strip of cake with the filling is supported on a moving conveyor and sliced and the apparatus described engages the strip in a direction perpendicular to the conveying direction to produce the necessary rolling to form the rolled product.

SUMMARY OF THE INVENTION

An object of the invention is to provide an improved rolling apparatus.

Another object of this invention is to provide apparatus adapted for rolling bakery type products in a uniform and continuous manner.

According to the broader aspects of the invention there is provided rolling apparatus including rotatably mounted rolling means, said rolling means including hingedly attached and arcuate rolling members, one portion of which is displaceable from the housing forming the rolling means for engaging the strip-like product to be rolled.

A feature of the invention is to provide apparatus having a plurality of rolling means selectively positioned so that each rolling means engages one of a plurality of strip material for rollling the material during rotation of said rolling means, said rolling means having arcuate rolling members for rolling the material in a direction transverse to the conveying direction of said material.

BRIEF DESCRIPTION OF THE DRAWINGS

The invention will now be described in more detail by reference to a preferred embodiment as related to the accompanying drawings, in which:

FIGS. 1 and 2 are perspective views of a rolling means;

FIGS. 3A-3C illustrate the rolling means during the process of rolling an item;

FIG. 4 illustrates an apparatus incorporating a plurality of rolling means for simultaneously producing a number of rolled products.

DESCRIPTION OF THE PREFERRED EMBODIMENTS

Figure 5A:
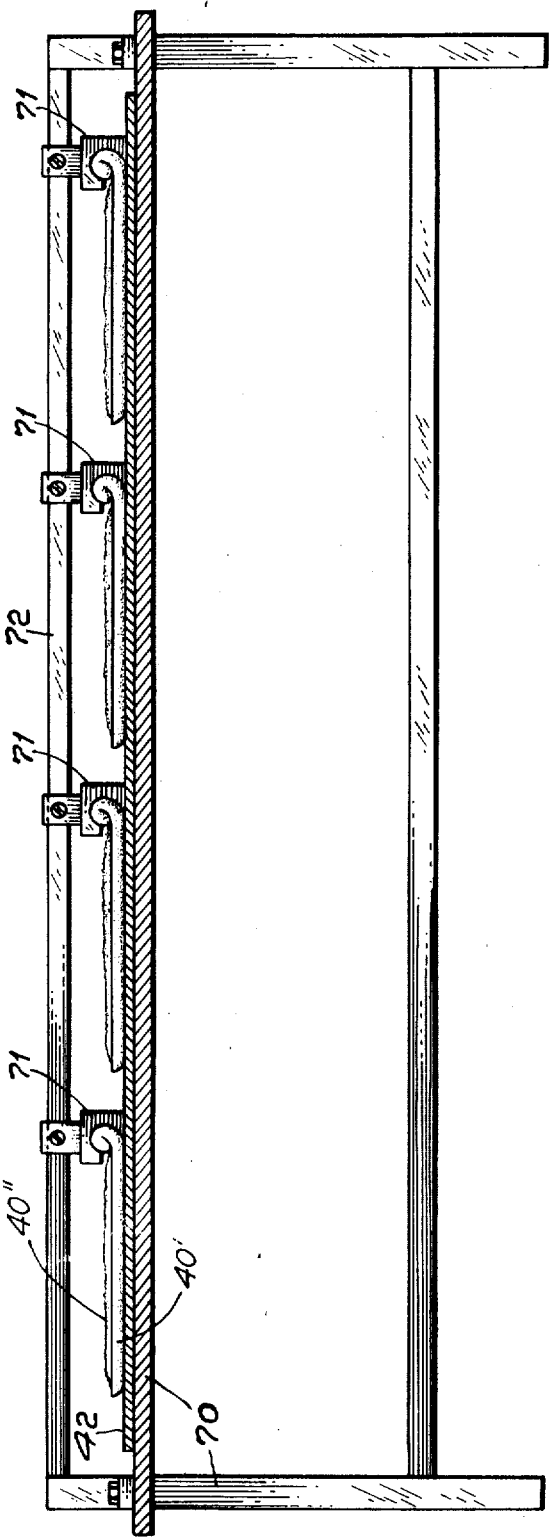
FIGS. 5a and 5b show means for rolling over the starting edge.

The rolling means as illustrated in the perspective views of FIGS. 1 and 2 will now be described. The rolling means generally indicated by numeral 10, comprises a housing consisting of spaced apart side walls 13, 14 in which at least four connecting rods 15 are positioned. To diagonally opposing rods 15 are hingedly mounted arcuate rolling members 11, 12. The arcuate rolling members 11, 12 are hingedly or pivotably mounted by means 12a and 11a (not shown) on the respective connecting rods. Attached to means 12a is an extension rod 12b, 11b which serves for mounting and retaining weights 12c, 11c. The weights serve to increase the force applied by the displaceable portion of the arcuate rolling member during the rolling operation. This feature is optional, and the weight utilized, if any, is dependent on the material or product to be rolled, the tightness and pressure of roll desired.

The surface 11s, 12s of the arcuate rolling members are serrated to enhance rolling the cake-like product described in connection with the invention. This surface has a length dimension 15 which is equal to the length or number of items to be rolled, and any overhang additional portions forming the members 11, 12 may be smooth. Attached to the spaced apart walls 13, 14 are bearing mounts 13a, 14a in which are positioned nylon bushings 13b, 14b through which a rotatably and slidably positioned drive shaft 16 is located. Fixed to the drive shaft is a drive coupling 17 which has nylon slidable mounts 17a, 17b adapted to slide and engage drive rods 18 for causing rotation of the rolling means 10 when shaft 16 is rotated by means of fixing screw 19, fixing coupling 17 to shaft 16.

Referring now to FIGS. 3A-3C, the principle of rolling a soft cake strip-like material 20 mounted on a conveying belt 21 by the rolling means 10 of the invention is illustrated. For purposes of explanation and an understanding of the relative sizes involved, the strip material 20 shown to be rolled has a width of approximately 5 inches. The angle 22 of arc which forms an arcuate member is approximately 60° on a 5 inch radius from the center of rotation 23 of rolling means 10. The short length 24 of the housing is approximately 5 inches and the long length 25 is approximately 9 inches. It should further be understood that the cake product 20 is traveling towards the viewer, out of the paper. The length of the product is considered to be into the paper, and may be as long as is reasonable in keeping with the desires of the user. However, dimension 15, FIG. 1, for purposes of this disclosure is approximately 15 inches long and provides approximately three 2-inch long rolls, which enables simultaneous rolling three cake rolls in every half turn of the roll means 10.

As illustrated, the hub 14a is fixedly mounted in a hub mount 26 attached to frame 27. The hub 14 is secured to the hub mount 26 by a fixing plate 28 and set screws 29. A frame guide 30 is positioned and fixed to the frame 27 to guide and partially support the arcuate member next in position for rolling. As illustrated, rolling member 11 engages the flat cake strip product 20 at the upturned and enfolded starting edge 20a during rotation in the direction of arrow 31, and causes the product to be completely rolled as determined by the curvature and speed of rotation of the arcuate member. These is no relative speed between roller means 10 and item 20, since they both travel at the same speed as will be described in connection with FIG. 4. As illustrated in FIG. 3C, a complete roll 20 is formed. Arcuate member 12 will then follow the same procedure and be guided by guide means 30 to engage the next started edge 32a of the product 32 and cause it to be rolled in a similar manner as accomplished by member 11. Thereby, in one complete rotation of roll means 10, two rolling procedures have been completed, with the length of the roll determined by the dimension 15 of the arcuate members. It should be noted that the plowed over starting edge is shifted off center of roller shafts in the direction of rotation approximately one-half inch so that the shoe is starting to rise as it rolls the dough as shown in FIG. 3A.

FIG. 3 illustrates an apparatus using a plurality of roll means 10 for forming a plurality of cake rolls 40 according to the invention. The soft cake strip material having a layer of cream thereon and having been sliced to suitable lengths indicated by 41. These strip-like cake rows are conveyed through the apparatus by conveying belt 42 which is moving and mounted in a standard manner. The apparatus overlaying the conveying path includes a frame 43 movable in the directions indicated by arrow 44 on rollers 45. The rollers 45 move in a trough-like track 46 mounted by support means 47. The frame 43 includes cross slats 48 for mounting the individual rolling means 10 as shown and described in connection with FIG. 3. An input drive shaft 50 is coupled by pulley 51, drive belt 52, to cam pulley 53 which, by means of shaft 54, causes rotation of cam 55 in the direction of arrow 56. Cam follower 57, mounted to extension 43a of the frame 43, follows camming surface 55a, and causes the frame 43 to move toward the left lower corner as viewed in FIG. 4. This movement is synchronized with the travel of belt 42. A weight 58 or other spring-like return member is attached by means 59 to the frame to rapidly return the frame toward the gear box arrangement 60. A resilient stop 61 is attached to the arrangement 60 to stop the rearward movement of frame 43.

Drift shaft 50 is also coupled by pulley 62 and coupling belt 63, to gear pulley 64. This drive by shaft 65 is coupled through known type gearing arrangements to shafts 65 to enable continuous rotation of each of the rolling means 10. The rotation of the rolling means 10 and movement of the frame are set to insure that the edge 41a of the next items to be rolled coincides with the edge 10a during rotation of the rolling means 10. This may be accomplished in any well known manner, for example motor speed control to drive shaft 50, various pulley coupling sizes and ratios. Since the movement of frame 43 is controlled by cam 55 to be equal to the linear speed of the moving cake items 40, there is no relative speed difference between rolling means 10 and the strip to be rolled. In one complete rotation of means 10, there will be two traversals by frame 43, and two rollings are effected.

Figure 5B:
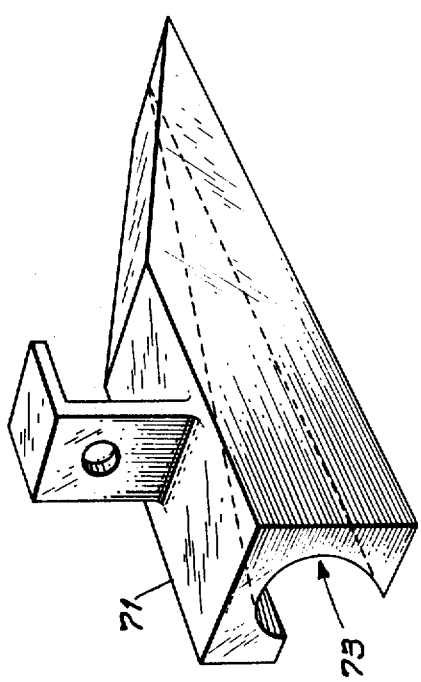

Referring now to FIGS. 5A and 5B, means for upturning and enfolding the starting edge of cake strip is illustrated. It has been determined that a starting edge roll is advantageous for cake rolls and enables the rolling means to effect a superior cake roll. The rolling is accomplished by a Teflon plow that rolls over the starting edge of the dough strip just after the cream roller and ahead of the cutter which precedes the rolling apparatus illustrated in FIG. 4. The apparatus for starting the roll is illustrated in FIG. 5A and includes a support table 70 on which rides the conveying belt 42 moving out of the drawing toward the viewer. Mounted above the table and proximate the start edge of the unrolled soft cake strip material 40' having a layer of cream 40" thereon, is a Teflon plow 71 for each of the four strips to be rolled. A cross slat 72 is fixed to the support table 70 and retains the plows in their proper position. FIG. 5B is a perspective view of the plow 71 having a cone shaped tunnel cavity for causing the roll over of the starting edge of the flat strip in a known manner.

While I have described above the principles of my invention in connection with specific apparatus, it is to be clearly understood that this description is made only by way of example and not as a limitation to the scope of my invention as set forth in the objects thereof and in the accompanying claims.

I claim:

1. Apparatus for producing rolls from a flat strip of material comprising:

means for supporting and conveying said strip along a predetermined path transversely of the rolling direction;

frame means overlying said path and mounted for reciprocal motion over said path; and rolling means rotatably mounted on said frame, said rolling means having an arcuate rolling member with a displaceable portion positioned and adapted to engage said strip to form a roll of material during rotation of said rolling means and movement of said frame in timed relation with said strip.

2. Apparatus of claim 1 including another arcuate rolling member mounted on said rolling means, and positioned to engage said strip and form another roll of material, such that a pair of rollings are accomplished during each rotation of said roll means.

3. Apparatus of claim 2 including drive means coupled to said frame and said rolling means, said drive means adapted to cause timed movement of said frame and rotation of said rolling means.

4. Apparatus for producing a plurality of roll cake products from a strip of flat cake material comprising:

means for conveying a plurality of strips through said apparatus;

a plurality of rolling means rotatably mounted on a frame and each having arcuate rolling members positioned so that individual ones of said rolling members engage individual strips and cause rolling of said strips in a direction transverse to said conveying direction during rotation of said rolling means;

means coupled for rotationally driving each of said rolling means; and means coupled to said frame for causing said frame to transverse the rolling position in a predetermined manner.

5. Apparatus of claim 4 wherein said means for causing said frame carrying said rolling means to traverse over the rolling position include drive cam means and means for returning said frame to an initial position.

6. Apparatus of claim 4 including a frame guide associated with each of said rolling means and mounted on said frame means and positioned to support a displaceable portion of said arcuate rolling member during predetermined portions of rotations of each of said rolling means.

7. Cake apparatus for producing cake rolls from a flat strip of cake material on which is deposited a layer of filling, and the strip being cut into predetermined lengths and having a starting roll edge, the cake apparatus comprising:

means for supporting and conveying a plurality of said strips along a path;

frame means overlying said path mounted for reciprocal motion over said path;

a plurality of rolling means, one for each of said strips, rotatably mounted in staggered relationship on said frame and positioned above an associated one of said strips;

each of said rolling means including one arcuate rolling member having a displaceable portion adapted for engagement with the associated one of said strips to effect rolling thereof in a direction transverse to the conveying direction; and another arcuate rolling member mounted in a complemented manner on said rolling means to effect rolling of the next portion of said associated one strip, such that two sequential rollings occur during one rotation of said rolling means.

8. Cake apparatus of claim 7 wherein each of said rollings is effected during movement of said frame means in synchronism with conveyance of said strip.

9. Apparatus for producing confectionary rolls from a flat strip of confectionary material comprising:

means for supporting and conveying said strip along a predetermined path transversely of the rolling direction;

frame means overlying said path and mounted for reciprocal motion over said path;

rolling means rotatably mounted on said frame, said rolling means having an arcuate rolling member with a displaceable portion positioned and adapted to engage a turned edge of said strip to form a roll of material during rotation of said rolling means and movement of said frame in timed relation with said strip; and another arcuate rolling member mounted on said rolling means, and positioned to engage a subsequent turned edge of said strip and form another roll of material, such that a pair of rollings are accomplished during each rotation of said roll means.

10. The apparatus of claim 9 including means in the path of said strip for engaging and forming the beginning of a roll.

11. Apparatus for producing rolls from a flat strip of cake or confectionary type material, the apparatus comprising in combination:

means for supporting and conveying a plurality of said strips along a path, and means along said path for engaging said strip and forming a beginning of a roll;

frame means overlying said path mounted for reciprocal motion over said path;

a plurality of rolling means, one for each of said strips, rotatably mounted in staggered relationship on said frame and positioned above an associated one of said strips, each of said rolling means including an arcuate rolling member having a displaceable portion adapted for engagement with the associated one of said strips to effect rolling thereof in a direction transverse to the conveying direction, and another arcuate rolling member mounted in a complemented manner on said rolling means to effect rolling of the next portion of said associated one strip, such that two sequential rollings occur during one rotation of said rolling means; and each of said rollings is effected during movement of said frame means in synchronism with conveyance of said strip.

* * * * *